(12) United States Patent
Krizan et al.

(10) Patent No.: US 11,005,320 B2
(45) Date of Patent: May 11, 2021

(54) VARIABLE FLUX BRIDGE FOR ROTOR OF AN ELECTRIC MACHINE

(71) Applicant: Ford Global Technologies, LLC, Dearborn, MI (US)

(72) Inventors: Jacob Krizan, Farmington Hills, MI (US); Joel Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 15/971,015

(22) Filed: May 4, 2018

(65) Prior Publication Data

US 2019/0341820 A1    Nov. 7, 2019

(51) Int. Cl.
    *H02K 1/27*      (2006.01)
    *B60L 50/50*      (2019.01)

(52) U.S. Cl.
    CPC ............ *H02K 1/2766* (2013.01); *B60L 50/50* (2019.02)

(58) Field of Classification Search
    CPC ............... H02K 1/2766; H02K 21/028; H02K 2213/09; B60L 11/18; B60L 15/02; B60L 2240/421; B60L 2240/423; B60L 50/50; B60L 50/60
    USPC ................................................... 310/156.84
See application file for complete search history.

(56) References Cited

U.S. PATENT DOCUMENTS

| | | | |
|---|---|---|---|
| 4,339,874 A | 7/1982 | Mc'Carty et al. | |
| 6,531,799 B1* | 3/2003 | Miller | H02K 21/046 310/112 |
| 7,105,979 B1* | 9/2006 | Gabrys | H02K 3/47 310/266 |
| 7,567,006 B2 | 7/2009 | Ichiyama | |
| 7,622,840 B2 | 11/2009 | Yonemori et al. | |
| 8,269,390 B2 | 9/2012 | Sakai et al. | |
| 8,562,471 B2* | 10/2013 | Savagian | H02K 21/029 475/149 |
| 8,653,710 B2 | 2/2014 | Takahashi et al. | |
| 9,306,423 B2 | 4/2016 | Jang et al. | |
| 2006/0113858 A1* | 6/2006 | Hino | B60L 15/007 310/156.53 |
| 2011/0304235 A1 | 12/2011 | Hashiba et al. | |
| 2017/0163108 A1 | 6/2017 | Schencke et al. | |
| 2018/0145575 A1 | 5/2018 | Woehl-Bruhn et al. | |
| 2018/0342936 A1 | 11/2018 | Krizan | |

FOREIGN PATENT DOCUMENTS

| | | | | |
|---|---|---|---|---|
| CN | 201146439 Y | 11/2008 | | |
| CN | 102710043 B | 3/2014 | | |
| CN | 105871157 A | 8/2016 | | |
| CN | 205509692 U | 8/2016 | | |
| DE | 102016112618 A1 | 1/2017 | | |
| WO | WO-2016000699 A1 * | 1/2016 | ............... | H02K 1/28 |

* cited by examiner

Primary Examiner — Alex W Mok
(74) Attorney, Agent, or Firm — David B Kelley; Brooks Kushman P.C.

(57) ABSTRACT

An electric machine includes a rotor including a channel defined between a pair of magnets and a bridge assembly within the channel. The bridge assembly includes a bridge element and a spring arranged to bias the bridge element toward a center of the rotor such that responsive to spinning of the rotor, the bridge element moves radially away from the center against a force of the spring to alter a magnetic flux pattern associated with the magnets.

15 Claims, 6 Drawing Sheets

VARIABLE FLUX BRIDGE FOR ROTOR OF AN ELECTRIC MACHINE

TECHNICAL FIELD

The present disclosure relates to an electric machine assembly of an electrified vehicle.

BACKGROUND

Extended drive range technology for electrified vehicles, such as battery electric vehicles (BEVs), hybrid electric vehicles (HEVs), and plug in hybrid vehicles (PHEVs), is continuously improving. Achieving these increased ranges, however, often requires traction batteries and electric machines to have higher power outputs and associated thermal management systems with increased capacities in comparison to previous BEVs and PHEVs. Improving efficiency between electric machine stator cores and rotors may increase power outputs of the electric machines.

SUMMARY

In at least one approach, an electric machine assembly is provided. The electric machine assembly may include a stator core defining a cavity, and a rotor disposed within the cavity. The rotor may include a channel defined between a pair of magnets and a bridge assembly disposed within the channel. The bridge assembly may include a bridge element and a spring arranged to bias the bridge element toward a center of the rotor such that the bridge element is disposed a first distance from the center of the rotor when the rotor is rotated at a first speed, and is disposed a second distance from the center of the rotor greater than the first distance when the rotor is rotated at a second speed greater than the first speed.

In at least one approach, an electric machine is provided. The electric machine may include a rotor including a channel defined between a pair of magnets and a bridge assembly within the channel. The bridge assembly may include a bridge element and a spring arranged to bias the bridge element toward a center of the rotor such that responsive to spinning of the rotor, the bridge element moves radially away from the center against a force of the spring to alter a magnetic flux pattern associated with the magnets.

In at least one approach, an electric machine assembly is provided. The electric machine assembly may include a stator core defining a cavity and a rotor disposed within the cavity. The rotor may include first and second magnet pockets, a first magnet disposed within the first magnet pocket, and a second magnet disposed within the second magnet pocket. The first and second magnets may have the same polarity. The rotor may further include a channel located between first and second magnet pockets, a first flux bridge extending between the first magnet pocket and the channel, and a second flux bridge extending between the second magnet pocket and the channel. The first flux bridge may have a first wall interfacing the first magnet pocket and a second wall interfacing the channel. The second flux bridge may have a third wall interfacing the second magnet pocket and a fourth wall interfacing the channel. The rotor may further include a bridge disposed within the channel for translation between at least an at rest position and an active shunt flux position. The first wall may extend parallel to the second wall, and the third wall may extend parallel to the fourth wall.

In at least one approach, a vehicle electric machine assembly is provided. The vehicle electric machine assembly may include a stator core defining a cavity, and a rotor disposed within the cavity. The rotor may include a channel defined between two magnets of the same polarity. The vehicle electric machine assembly may further include a bridge disposed within the channel for translation between at least a first and a second position. The translation of the bridge may adjust a path of magnetic flux from the rotor to the stator core based on the bridge position.

In at least one approach, an electrified vehicle electric machine assembly is provided. The electrified vehicle electric machine assembly may include a stator core defining a cavity and a rotor disposed within the cavity. The rotor may include a channel located between a first and a second magnet of the same polarity. The electrified vehicle electric machine assembly may further include a bridge and a spring. The bridge may be disposed within the channel for translation. The spring may be disposed within the channel and may be oriented to bias movement of the bridge toward a direction opposite a centrifugal force direction created by rotation of the rotor.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
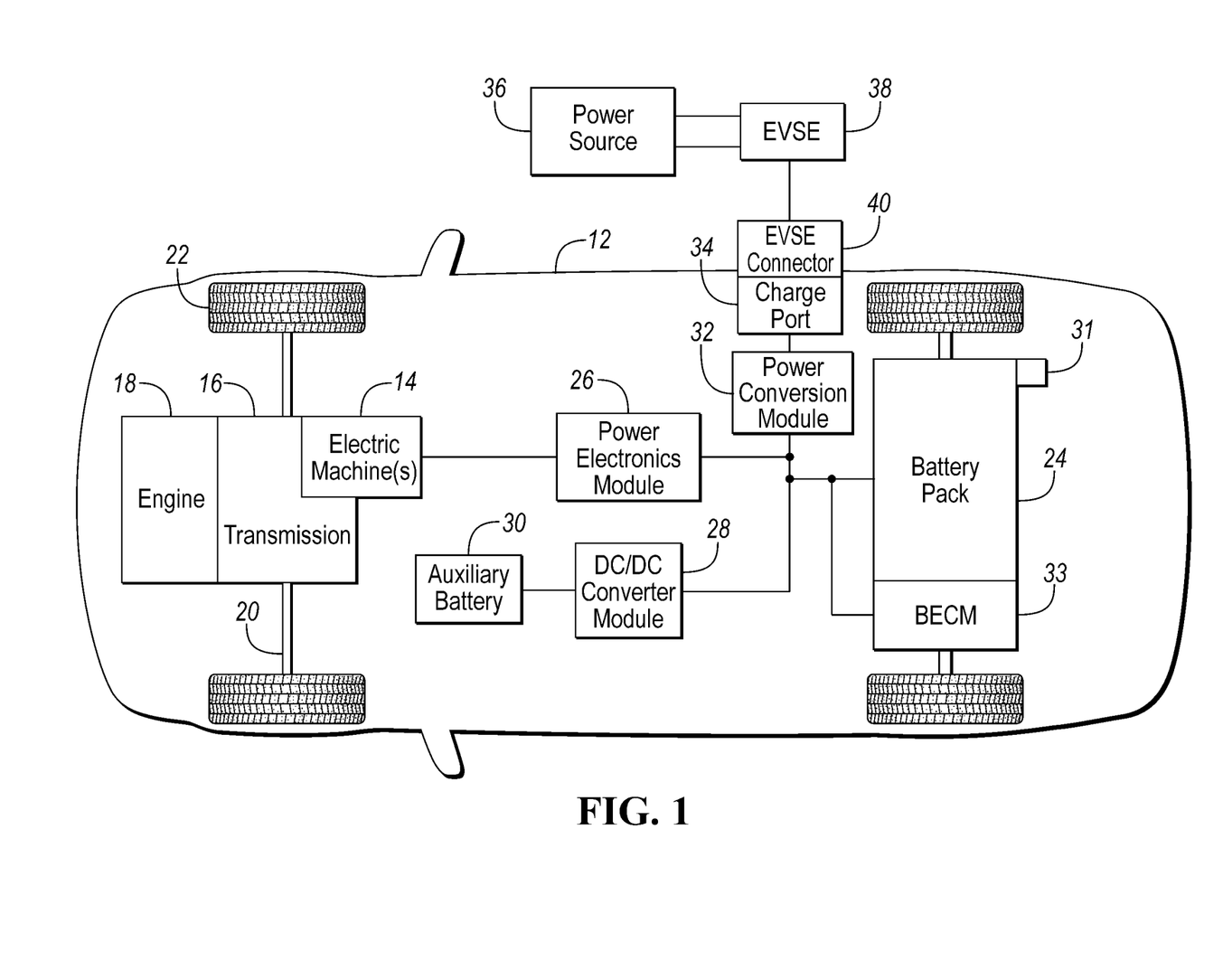
FIG. 1 is a schematic diagram illustrating an example of an electrified vehicle.

FIG. 1 is a schematic diagram illustrating an example of an electrified vehicle. In this example, the electrified vehicle is a PHEV referred to as a vehicle 12 herein. The vehicle 12 may include one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that may be mechanically connected to wheels 22. The electric machines 14 can provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery 24 may store energy that can be used by the electric machines 14. The traction battery 24 may typically provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors may isolate the traction battery 24 from other components when opened and connects the traction battery 24 to other components when closed. The power electronics module 26 may also be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

The various components discussed above may have one or more associated controllers to control and monitor the operation of the components. The controllers may communicate via a serial bus (e.g., a controller area network (CAN)) or via discrete conductors.

The battery cells of the traction battery 24, such as a prismatic or pouch-type cell, may include electrochemical elements that convert stored chemical energy to electrical energy. Prismatic cells or pouch-type cells may include a housing, a positive electrode (cathode) and a negative electrode (anode). An electrolyte may allow ions to move between the anode and cathode during a discharge operation, and then return during a recharge operation. Terminals may allow current to flow out of the battery cells for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Figure 2:
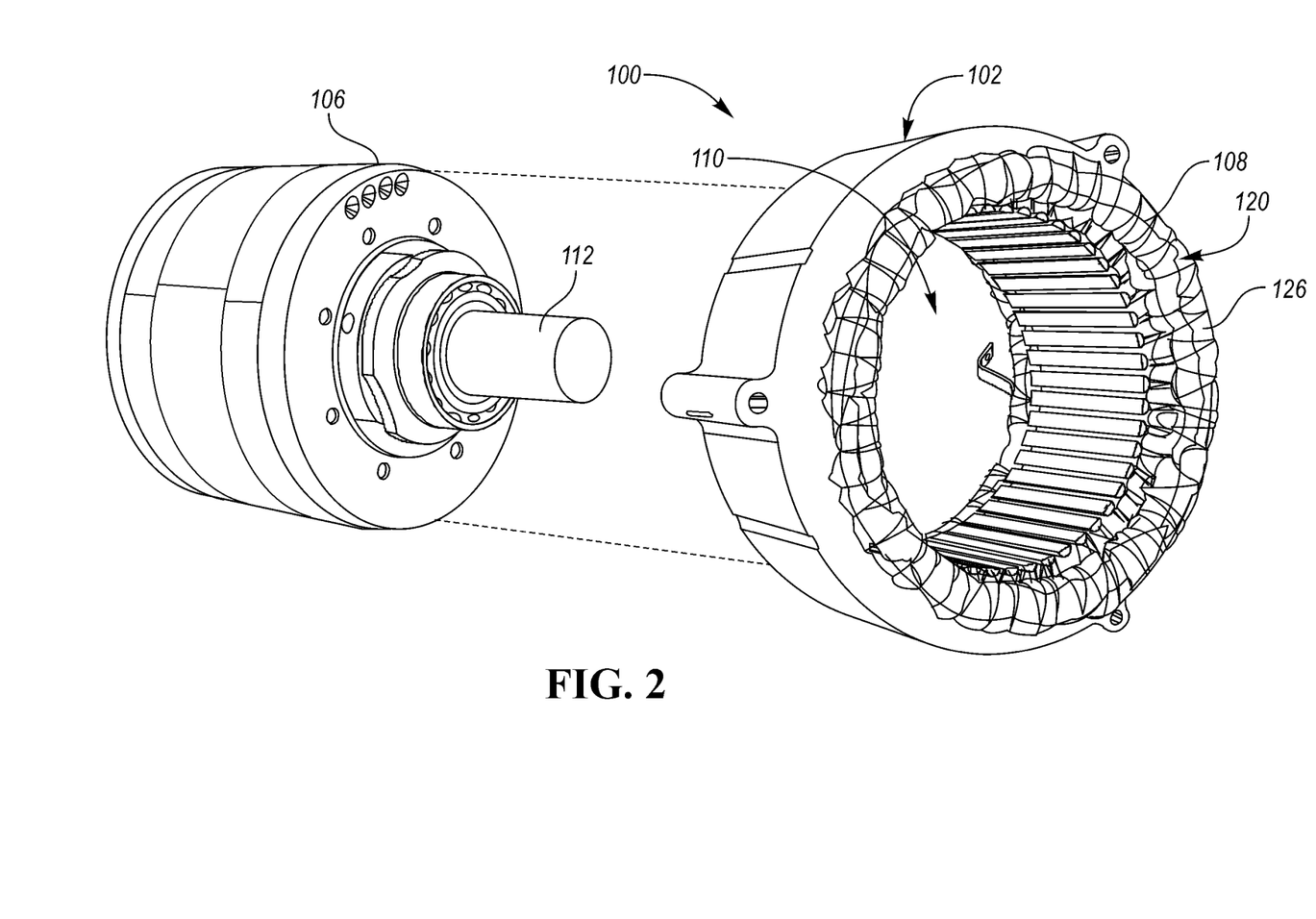
FIG. 2 is a perspective, exploded view of an example of a portion of an electric machine.

FIG. 2 is a partially exploded view illustrating an example of portions of an electric machine for an electrified vehicle, referred to generally as an electric machine 100 herein. The electric machine may include a stator core 102 and a rotor 106. As mentioned above, electrified vehicles may include two electric machines. One of the electric machines may function primarily as a motor and the other may function primarily as a generator. The motor may operate to convert electricity to mechanical power and the generator may operate to convert mechanical power to electricity. The stator core 102 may define an inner surface 108 and a cavity 110. The rotor 106 may be sized for disposal and operation within the cavity 110. A shaft 112 may be operably connected to the rotor 106 and be coupled to other vehicle components to transfer mechanical power therefrom.

Windings 120 may be disposed within the cavity 110 of the stator core 102. In an electric machine motor example, current may be fed to the windings 120 to obtain a rotational force on the rotor 106. In an electric machine generator example, current generated in the windings 120 by a rotation of the rotor 106 may be used to power vehicle components. Portions of the windings 120, such as end windings 126, may protrude from the cavity 110. During operation of the electric machine 100, heat may be generated along the windings 120 and end windings 126. The rotor 106 may include magnets such that rotation of the rotor 106 in cooperation with an electric current running through the end windings 126 generates one or more magnetic fields. For example, electric current running through the end windings 126 may generate a rotating magnetic field. Magnets of the rotor 106 may magnetize and rotate with rotating magnetic field to rotate the shaft 112 for mechanical power.

Figure 3:
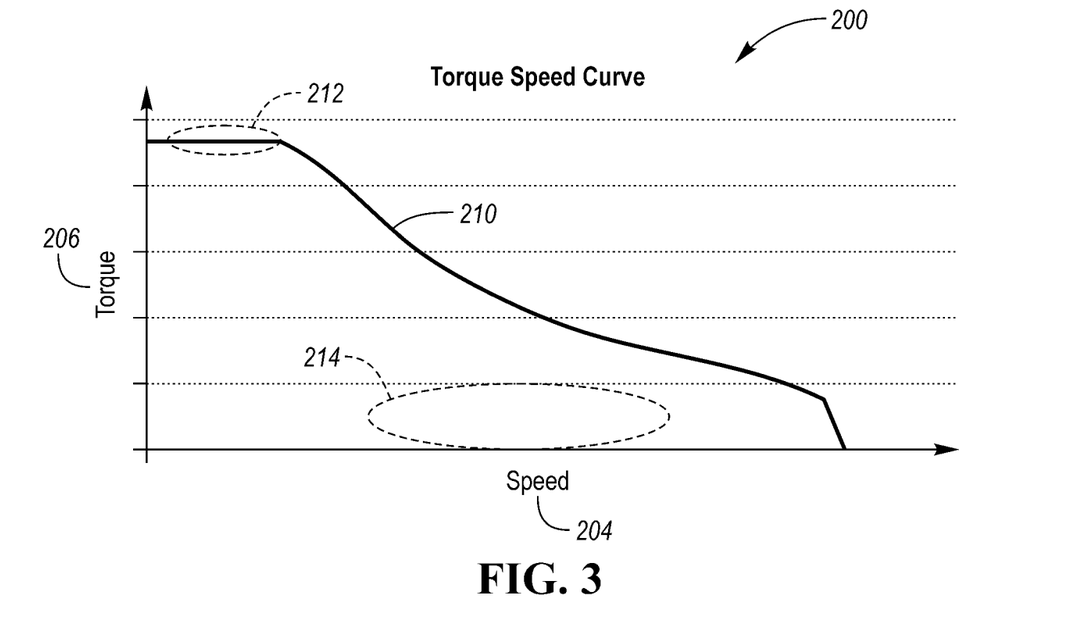
FIG. 3 is a graph showing an example of a torque speed curve for an electric machine.

FIG. 3 shows a graph illustrating an example of a torque speed curve for an electric machine, generally referred to as a graph 200 herein. An X-axis 204 represents a speed of rotor rotation and a Y-axis 206 represents torque for electric machine operation. Torque speed curve 210 represents a typical torque output versus rotor speed for an electric machine. Region 212 represents an area of a high torque performance requirement and region 214 represents an area of low torque drive cycle points. Electric machine function in automotive traction applications may require high torque for performance relative to an amount of torque required to operate through much of EPA efficiency cycles. Permanent magnet motors are often used due to their high efficiency provided by "free" rotor magnetic fields associated with permanent magnets. However, one drawback is that this free rotor magnetic field is always "on" and stator core loss in the electric machine is a function of the magnetic field. For high torque points, a large rotor field is needed to product a large amount of torque with low current. However, for low or zero torque points, a large rotor field may create high stator core loss. Consequently, for electric machines that require high maximum torque and low drive cycle torque, the constant permanent magnet rotor field is typically only optimized for one of the desired conditions.

Figure 4:
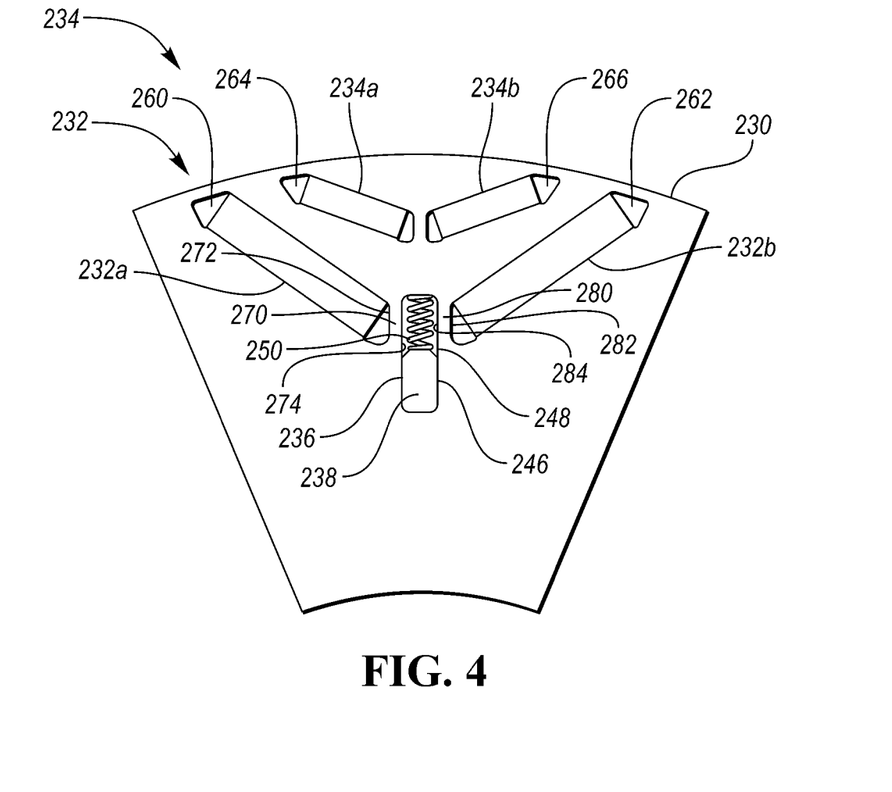
FIG. 4 is a partial front view, in cross-section, of a portion of an example of a rotor for an electric machine.

FIG. 4 is a partial cross-sectional view illustrating an example of a portion of a rotor of an electric machine, referred to as a rotor 230 herein. The electric machine may operate with an electrified vehicle or a vehicle including only an internal combustion engine. The rotor 230 may include an assembly to create a permanent magnet machine with variable rotor flux by using a sliding bridge to create a rotor flux field that varies with rotor 230 rotational speed and a position of a bridge. Creating variable rotor flux provides both high and low torque outputs to accommodate varied torque demands in a vehicle drive cycle. With variable rotor flux, a torque output of a shaft coupled to the rotor 230 may be tuned based on a speed of rotation of the rotor 230. For example, the rotor 230 may include a pair of first magnets 232, a pair of second magnets 234, and a channel 236 disposed between the first pair of magnets 232. The magnets may be, for example, rare-earth magnets such as neodymium magnets. The channel 236 may be spaced substantially equidistant from the first pair of magnets 232. A first end of the channel 236 may be spaced from an outer surface of the rotor 230 a distance based on predetermined stress operating parameters of the rotor 230. A bridge element, referred to herein as a bridge 238, may be disposed within the channel 236 for translation between at least first and second positions. For example, a centrifugal force created by rotation of the rotor 230 may influence movement of the bridge 238 within the channel 236. The bridge 238 may be of a soft ferromagnetic material having a high susceptibility to magnetism and high permeability characteristics. Examples of materials for the bridge 238 include silicone steel, iron, cobalt, and ferrite.

By predictably controlling a position of the bridge 238 within the channel 236, shunt flux path thickness may be changed depending on positioning of the bridge 238. The bridge 238 may be positioned in an at rest region 246 when the rotor 230 is at rest. The bridge 238 may slide through a transitional region to an active shunt flux region 248 when the rotor 230 is rotating due to the centrifugal force. The bridge 238 is in a full shunt region when positioned at or near an upper wall of the channel 236. The bridge 238 may be disposed within the channel 236 such that air pockets are defined on either side of the bridge 238. The air pockets may operate as flux barriers to block rotor flux leakage until the bridge 238 is in the active shunt flux region 248. In at least one approach, the channel 236 and bridge 238 may be arranged with one another to define a first air pocket on one side of the bridge 238 within the channel 236 and a second air pocket on another side of the bridge 238 within the channel 236. The first air pocket may define a region for the at rest position and the second air pocket may define a region for the active shunt flux position.

Optionally, a spring 250 may be disposed within the channel 236 to bias movement of the bridge 238 in a predictable fashion. For example, the spring 250 may be oriented within the channel 236 to predictably influence centripetal force to oppose the centrifugal force acting on the bridge 238 when the rotor 230 is rotating as mentioned above. Additionally, the spring 250 may operate to retain the bridge 238 in the at rest region 246 when the rotor 230 is not rotating. The spring 250 may be secured to one end of the bridge 238 and to an interior surface of the channel 236. The spring 250 may operate to predictably influence the bridge 238 to be located within the active shunt flux region 248 under certain conditions such as a speed at which the rotor 230 is rotating. The bias of the spring 250 may be tuned based on a size of the rotor, a centrifugal force range based on operating conditions of the rotor 230, and motor torque speed specifications.

Figure 5:
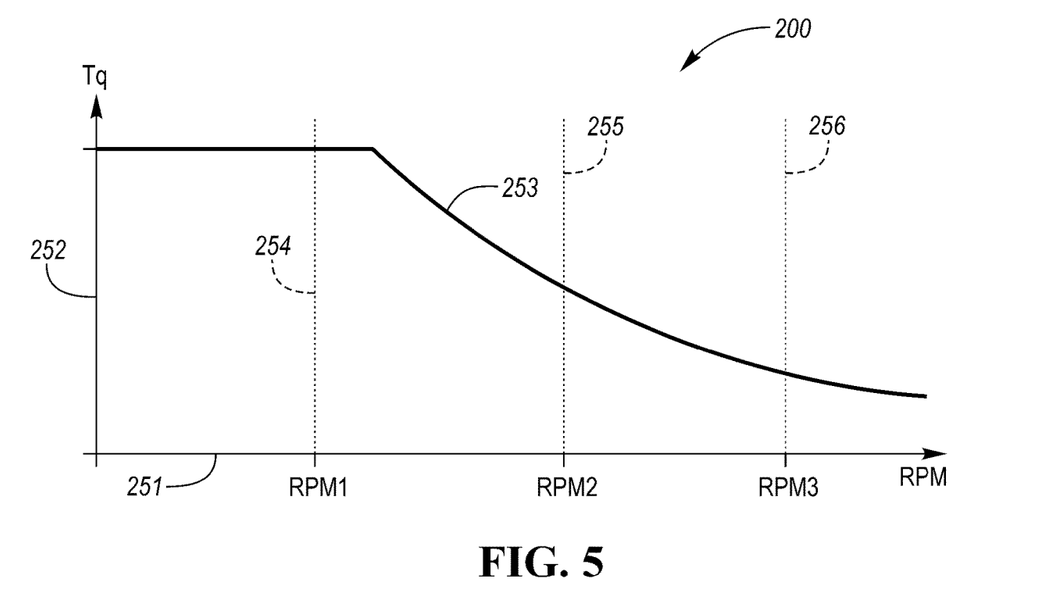
FIG. 5 is a graph showing another example of a torque speed curve for an electric machine.
Figure 6:
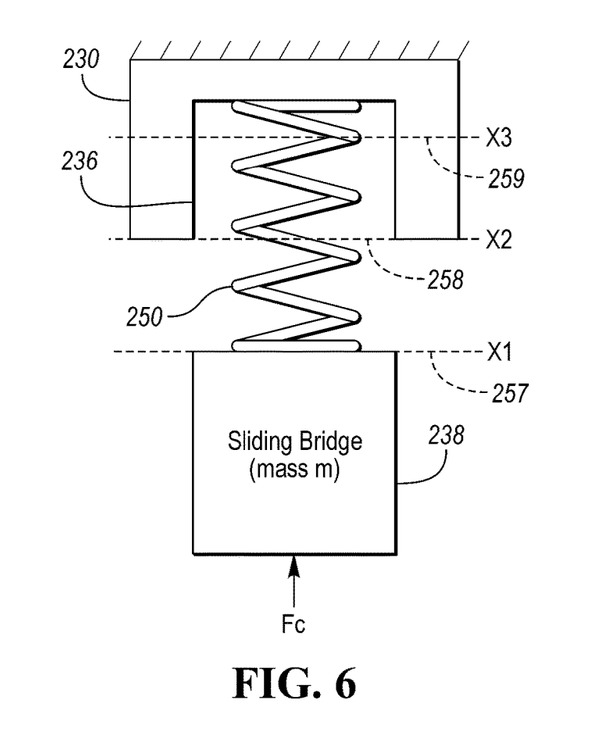
FIG. 6 is a schematic diagram showing an example of a relationship between a spring and sliding bridge of a rotor.

FIGS. 5 and 6 illustrate an example of a mechanical relationship between a spring, bridge, and rotor such as the spring 250, the bridge 238, and the rotor 230. In FIG. 5, an X-axis 251 represents revolutions per minute (RPM) and a Y-axis 252 represents torque. Line 253 represents a torque speed curve. Rotational speed of the rotor is represented at line 254 for RPM1, at line 255 for RPM2, and at line 256 for RPM3. As mentioned above, centrifugal force (represented in FIG. 6 by force arrow $F_c$) created by rotation of the rotor 230 may influence movement of the bridge 238 within the channel 236. The bridge 238 may be in the rest position when the rotor 230 is rotating at RPM1. The bridge 238 may be in between the transition region and the active shunt region when the rotor 230 is rotating at RPM2. The bridge 238 may be in a full shunt position when the rotor 230 is rotating at RPM3.

To influence positioning of the bridge 238 within the channel 236, a spring constant of the spring 250 may be based on a mass of the bridge 238 and desired movement of the bridge 238. FIG. 6 shows a schematic representation of the rotor 230, the bridge 238, and the spring 250. Line 257 at X1 may correspond to the at rest position of the bridge 238. Line 258 at X2 may correspond to a bridge 238 position between the transitional region and the active shunt region. Line 259 at X3 may correspond to the full shunt position of the bridge 238.

A force equation for the spring 250 may be represented by $$F_s = kx.$$

A force equation for the sliding bridge 238 mass under acceleration may be represented by $$F_c = mr\omega^2 = mr\pi \text{RPM}^2/30.$$

An equation of the system may be represented by $$k = \frac{mr\pi \text{RPM}^2}{30x} \text{ or } x = \frac{mr\pi \text{RPM}^2}{30k}.$$

To identify a spring constant of the spring 250 and deformation, desired speeds for transitions RPM1, RPM2, and RPM3 are defined based on performance requirements of the rotor 230. X1 may then be selected and k may be solved for at RPM1. Using k, X2 may be solved for at RPM2 and X3 may be solved for at RPM3.

Referring again to FIG. 4, the magnets 232, 234 may be disposed in magnet pockets. For example, a first magnet 232a may be disposed in a first magnet pocket 260 and a second magnet 232b may be disposed in a second magnet pocket 262. The first and second magnet pockets 260, 262 may be arranged with one another to define an inverted V shape. Other configurations are possible.

In at least one approach, additional magnets may be provided. For example, a third magnet 234a may be disposed in a third magnet pocket 264, and a fourth magnet 234b may be disposed in a fourth magnet pocket 266. The third and fourth magnet pockets 264, 266 may be disposed radially between the channel 236 and the stator core 102. The third and fourth magnet pockets 264, 266 may be arranged with one another to define an inverted V shape. The third and fourth magnet pockets 264, 266 may define a different angular orientation than an angular orientation defined by the first and second magnet pockets 260, 262.

In at least one approach, magnet pairs may have the same polarity. For example, the first and second magnets 232a, 232b may both represent a south pole, or the first and second magnets 232a, 232b may both represent a north pole. Similarly, the third and fourth magnets 234a, 234b may both represent a south pole, or the third and fourth magnets 234a, 234b may both represent a north pole.

The rotor 230 may define one or more flux bridges. For example, the rotor 230 may define a first flux bridge 270 that extends between the first magnet pocket 260 and the channel 236. The first flux bridge 270 may have a first wall 272 that interfaces the first magnet pocket 260 and a second wall 274 opposite the first wall 272 that interfaces the channel 236. The first wall 272 may at least partially extend in a plane that is parallel to the second wall 274.

The rotor 230 may further define a second flux bridge 280 that extends between the second magnet pocket 262 and the channel 236. The second flux bridge 280 may have a third wall 282 that interfaces the second magnet pocket 262 and a fourth wall 284 opposite the third wall 282 that interfaces the channel 236. The third wall 282 may at least partially extend in a plane that is parallel to the fourth wall 284.

In at least one approach, first wall 272 may extend parallel to the third wall 282. Still further, the first, second, third, and fourth walls 272, 274, 282, 284 may all extend at least partially in parallel planes.

Figure 7:
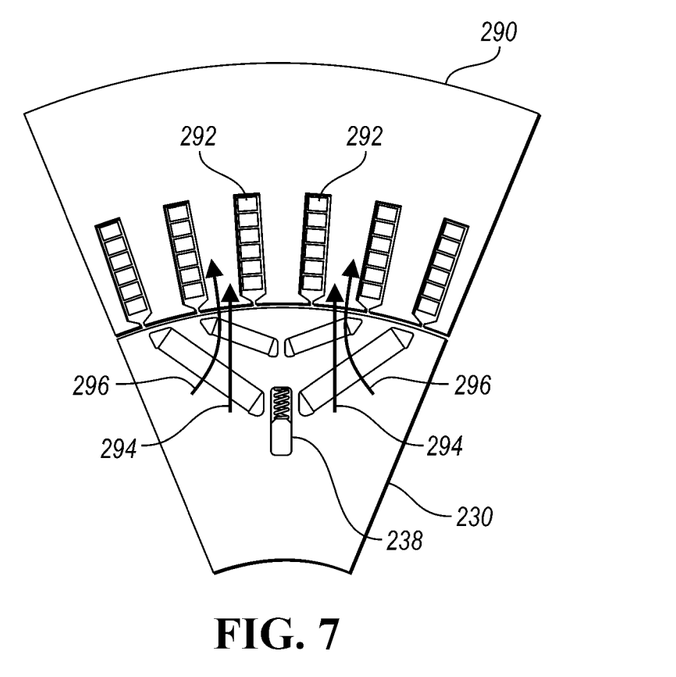
FIG. 7 is a partial front view, in cross-section, of a portion of an example of a rotor and stator for an electric machine showing a bridge in a first position.
Figure 8:
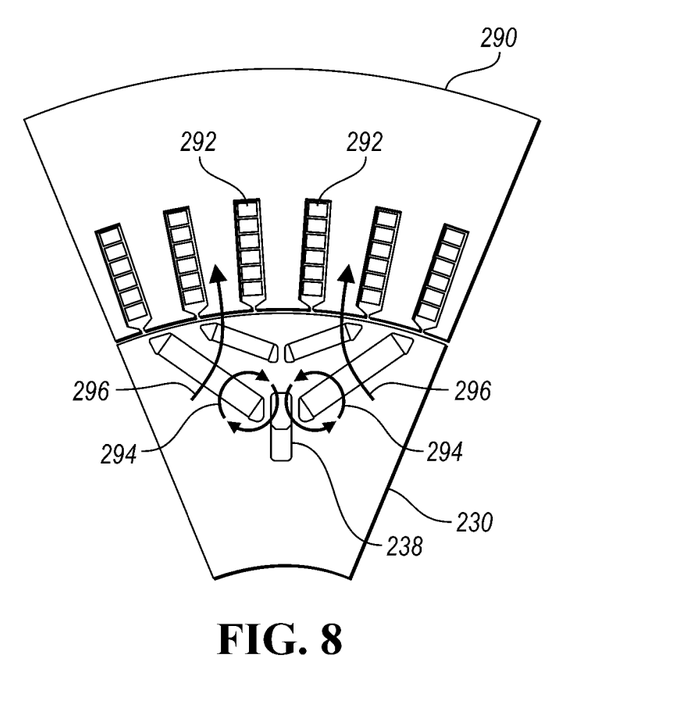
FIG. 8 is a partial front view, in cross-section, of the portion of the example of the rotor and the stator for an electric machine showing the bridge in a second position.

FIGS. 7 and 8 illustrate examples of positions for the bridge 238 to generate different magnetic flux paths relative to a stator core 290 having end windings 292. Magnetic shunt flux generated by the pair of first magnets 232 is represented by flow path 294. Magnetic flux generated by the stator core 290 is represented by flow path 296. In FIG. 7, the bridge 238 is shown not engaged with the flow path 294 and in the at rest position in the rest region 246. In this position, the bridge 238 promotes a flow of magnetic flux to the stator core 290. In FIG. 8, the bridge 238 is shown engaged with the flow path 294 and in the active shunt position in the active shunt flux region 248. In this position, the bridge 238 promotes magnetic flux flow generated by the pair of first magnets 232 to minimize induced voltage and magnetic loss by retaining magnetic flux within the rotor 230 while minimizing interaction with the end windings 292.

Figure 9:
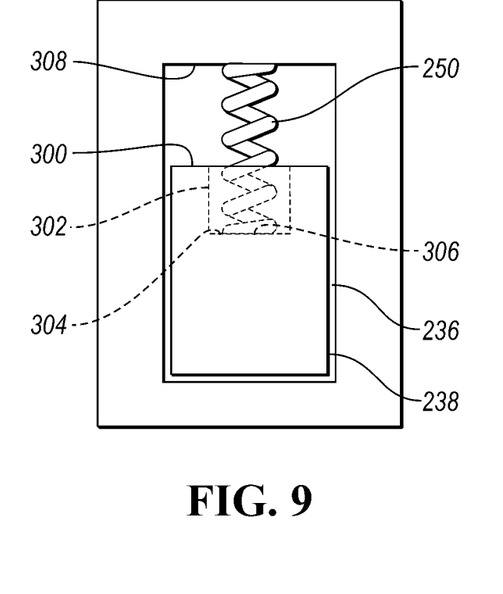
FIG. 9 is a schematic diagram showing a first bridge and spring arrangement with the bridge in a first position.
Figure 10:
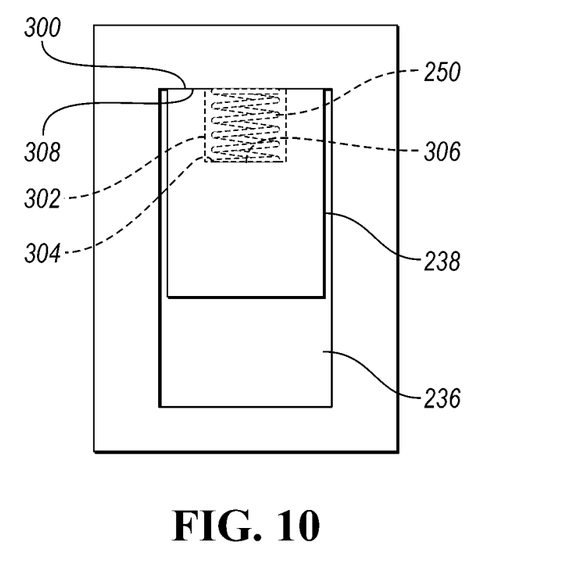
FIG. 10 is a schematic diagram showing the first bridge and spring arrangement with the bridge in a second position.

Referring now to FIG. 9, the bridge 238 may include an end surface 300 and a bridge cavity 302 extending from the end surface 300 to a cavity floor 304. The spring 250 may be secured at a first end 306 to the bridge 238 at the cavity floor 304. When the bridge 238 is in the rest position, the end surface 300 may be spaced apart from a channel end surface 308. As shown in FIG. 10, when the bridge 238 is in the active shunt flux position, the end surface 300 may engage the channel end surface 308.

Figure 11:
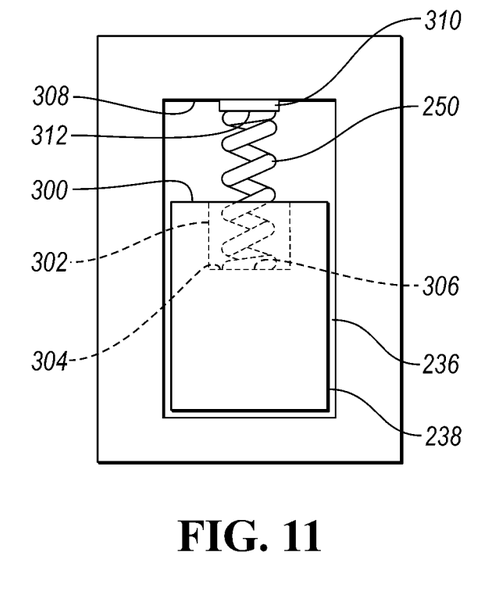
FIG. 11 is a schematic diagram showing a first bridge and spring arrangement with the bridge in a first position.
Figure 12:
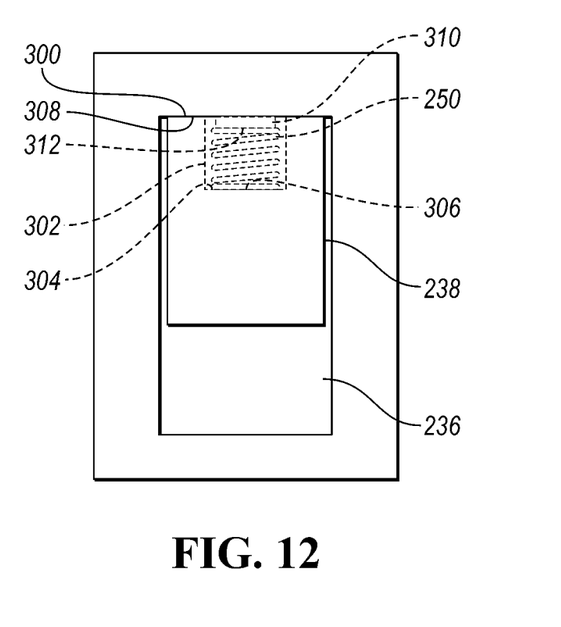
FIG. 12 is a schematic diagram showing the first bridge and spring arrangement with the bridge in a second position.

Referring now to FIGS. 11 and 12, a spring retainer 310 may be disposed on the channel end surface 308. The spring 250 may be secured at a second end 312 opposite the first end 306 to the spring retainer 310. As shown in FIG. 11, the spring retainer 310 may be spaced apart from the bridge cavity 302 when the bridge 238 is in a rest position. As shown in FIG. 12, the spring retainer 310 may be at least partially disposed within the bridge cavity 302 when the bridge 238 is in an active shunt flux position.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine assembly comprising:
    a stator core defining a cavity;
    a rotor disposed within the cavity, the rotor including
        a channel defined between a pair of magnets; and
        a bridge assembly disposed within the channel and including a bridge element and a spring arranged to bias the bridge element toward a center of the rotor such that the bridge element is disposed a first distance from the center of the rotor when the rotor is rotated at a first speed, and is disposed a second distance from the center of the rotor greater than the first distance when the rotor is rotated at a second speed greater than the first speed, the bridge element including an end surface and a bridge cavity extending from the end surface to a cavity floor, wherein the spring is secured at a first end to the bridge element at the cavity floor; and a spring retainer disposed on a channel end surface, wherein the spring is secured at a second end opposite the first end to the spring retainer, wherein the spring retainer is spaced apart from the bridge cavity when the bridge element is in a rest position, and wherein the spring retainer is at least partially disposed within the bridge cavity when the bridge element is in an active shunt flux position.

2. The electric machine assembly of claim 1 wherein ends of the magnets adjacent to the bridge assembly have same polarity.

3. The electric machine assembly of claim 1 wherein the bridge element alters a magnetic flux pattern associated with the magnets when the bridge element is disposed the second distance from the center of the rotor.

4. The electric machine assembly of claim 1 wherein the bridge element is ferromagnetic.

5. The electric machine assembly of claim 1 wherein the magnets are arranged to define an inverted V shape.

6. The electric machine assembly of claim 1 further comprising a second pair of magnets disposed radially between the pair of magnets and the stator core.

7. The electric machine assembly of claim 6 wherein the second pair of magnets are arranged to define an inverted V shape.

8. An electric machine comprising:
a rotor including a channel defined between a pair of magnets; and
a bridge assembly within the channel including a bridge element and a spring arranged to bias the bridge element toward a center of the rotor such that responsive to spinning of the rotor, the bridge element moves radially away from the center against a force of the spring to alter a magnetic flux pattern associated with the magnets, the bridge element including an end surface and a bridge cavity extending from the end surface to a cavity floor, wherein the spring is secured at a first end to the bridge element at the cavity floor, wherein the spring is secured at a second end opposite the first end to an end surface within the channel, wherein the second end is spaced apart from the bridge cavity when the bridge element is in a rest position, and wherein the second end is disposed within the bridge cavity when the bridge element is in an active shunt flux position.

9. The electric machine of claim 8 wherein ends of the magnets adjacent to the bridge assembly have same polarity.

10. The electric machine of claim 8 wherein the bridge assembly is configured such that a distance between bridge element and center increases as a speed of the spinning increases.

11. The electric machine of claim 8 wherein movement of the bridge element alters a permeability between the magnets.

12. The electric machine of claim 8 wherein the bridge element is ferromagnetic.

13. The electric machine of claim 8 wherein the rotor has a first magnetic property and the bridge element has a second magnetic property different than the first magnetic property.

14. An electrified vehicle electric machine assembly comprising:
a stator core defining a cavity;
a rotor disposed within the cavity and including a channel located between a first and a second magnet having the same polarity adjacent the channel;
a moveable bridge disposed within the channel, the moveable bridge including an end surface and a bridge cavity extending from the end surface to a cavity floor;
a spring disposed within the channel and oriented to bias movement of the moveable bridge toward a center of the rotor, wherein the spring is secured at a first end to the moveable bridge at the cavity floor; and
a spring retainer disposed on a channel end surface, wherein the spring is secured at a second end opposite the first end to the spring retainer, wherein the spring retainer is spaced apart from the bridge cavity when the moveable bridge is in a rest position, and wherein the spring retainer is at least partially disposed within the bridge cavity when the moveable bridge is in an active shunt flux position.

15. The assembly of claim 14 wherein the end surface is spaced from a channel end surface when the moveable bridge is in a rest position, and wherein the end surface engages the channel end surface when the moveable bridge is in an active shunt flux position.

* * * * *